H. BUTLER.
Evaporating Pan.
No. 43,566.
Patented July 19, 1864.
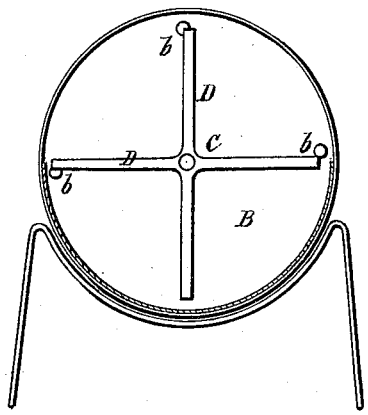
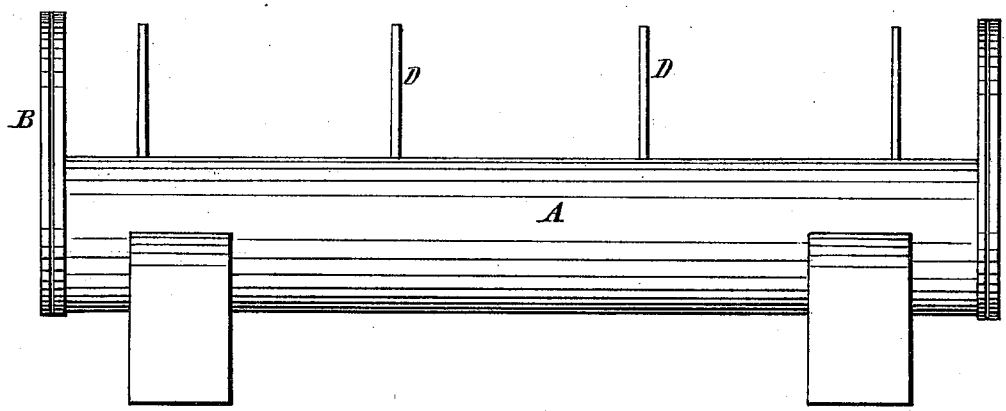
Witnesses:
G. Bread
A. Bowne
Inventor:
Harlow Butler
by his Atty
Daniel Breed.

UNITED STATES PATENT OFFICE.

HARLOW BUTLER, OF CHESTERFIELD, OHIO.

IMPROVEMENT IN THE MANUFACTURE OF SUGAR.

Specification forming part of Letters Patent No. 43,566, dated July 19, 1864.

*To all whom it may concern:*

Be it known that I, HARLOW BUTLER, of Chesterfield, in the county of Fulton and State of Ohio, have invented a new and useful Improvement in Sugar Manufacture; and I do hereby declare that the following is a full and exact description thereof, reference being had to the accompanying drawings, and to the letters of reference marked thereon.

My invention consists in the process of soaking sorghum and other sugar-cane in a solution of lime for the purpose of preventing fermentation and to facilitate the clarifying of the cane-juice.

In order to enable others to use my invention, I have constructed the accompanying apparatus as one means of carrying out my process.

In the accompanying drawings, Figure 1 is a side view of my apparatus. Fig. 2 is a cross-section of the same.

The semicircular trough A may be made of cast-iron or any other suitable material. It must be water-tight. The end pieces, B, may form a complete circle, with several holes, $b$, and a central hole for the revolving horizontal shaft C. This shaft is provided with a series of radial arms, D, and also with disks E, having holes $e$, corresponding to the holes $b$ in the ends of the trough. This trough being partially filled with lime-water, the canes are laid upon the radial arms D, filling one quarter or a quadrant of the revolving agitator. Then the agitator is turned through a quarter-revolution and the second quarter of the agitator is filled. By again turning the agitator this second portion of cane is brought into the trough. After the cane has soaked a few minutes, the agitator should be turned so as to raise some of the cane out of the water and trough ready for grinding. While this first portion of cane is being ground, another lot may be put upon the opposite side of the agitator and lowered into the water for soaking. Thus the canes are passed through the trough in successive portions and raised ready for grinding. The agitator may be secured in place, when loaded, by means of pins passed through the holes $b$ and $e$, which pins will prevent the shaft C from revolving. I prefer to use lime-water of about the strength of saturation.

The machine may be modified without departing from my invention, which is confined to the process of soaking sorghum and other sugar-canes in lime-water previous to grinding.

The advantages of my invention are chiefly the following: first, preventing or retarding fermentation; second, the moistening of the dry canes so as to prevent the juice from being soaked up and wasted; third, the softening of the silicious stiff crust of the canes; fourth, the promotion of clarification of the fuice by the presence of lime.

Having thus fully described my invention, what I claim, and desire to secure by Letters Patent of the United States, is—

The above-described process of soaking sorghum and other sugar-cane in lime-water previous to grinding, substantially in the manner and for the purposes described.

HARLOW BUTLER.

Witnesses:
 I. R. WEITZEL,
 DANIEL SCHLETTMER.